(12) United States Patent
Dixit et al.

(10) Patent No.: US 6,861,541 B2
(45) Date of Patent: Mar. 1, 2005

(54) METHOD FOR PREPARATION OF AN ANTHRAQUINONE COLORANT COMPOSITION

(75) Inventors: Arun Nandkishor Dixit, Karnataka (IN); Adil Minoo Dhalla, Dadar Mumbai Maharashtra (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/758,347

(22) Filed: Jan. 15, 2004

(65) Prior Publication Data

US 2004/0152814 A1 Aug. 5, 2004

Related U.S. Application Data

(62) Division of application No. 10/284,064, filed on Oct. 30, 2002, now abandoned.

(51) Int. Cl.$^7$ .......................................... C07C 231/02
(52) U.S. Cl. ....................................... 552/208; 552/251
(58) Field of Search ................................. 552/208, 251

(56) References Cited

U.S. PATENT DOCUMENTS

| | | | | |
|---|---|---|---|---|
| 3,507,606 A | * | 4/1970 | Hildreth et al. ................. | 8/679 |
| 3,635,895 A | | 1/1972 | Kramer ................... | 260/47 XA |
| 3,646,071 A | | 2/1972 | Frey et al. ................... | 260/371 |
| 3,697,395 A | | 10/1972 | Kehr et al. ............ | 204/159.14 |
| 3,697,402 A | | 10/1972 | Kehr et al. ............ | 204/159.14 |
| 3,768,976 A | | 10/1973 | Hu et al. .................. | 23/254 R |
| 3,880,869 A | | 4/1975 | Scheuermann et al. .. | 260/296 P |
| 3,923,454 A | | 12/1975 | Genta ........................... | 8/678 |
| 3,979,459 A | * | 9/1976 | Rose ........................... | 568/333 |
| 4,001,184 A | | 1/1977 | Scott ..................... | 260/47 XA |
| 4,128,396 A | | 12/1978 | Wick et al. .................... | 8/39 C |
| 4,179,548 A | | 12/1979 | Schroeter et al. ........... | 525/329 |
| 4,217,438 A | | 8/1980 | Brunelle et al. ............ | 528/202 |
| 4,220,707 A | | 9/1980 | Ohmura et al. ............. | 430/325 |
| 4,332,880 A | | 6/1982 | Izu et al. ..................... | 430/272 |
| 4,404,257 A | | 9/1983 | Olson ......................... | 428/412 |
| 4,491,508 A | | 1/1985 | Olson et al. ........... | 204/159.13 |
| 4,523,208 A | | 6/1985 | Barzynski .................... | 346/214 |
| 4,571,605 A | | 2/1986 | Motosugi et al. ........... | 346/216 |
| 4,863,634 A | | 9/1989 | Claussen et al. ......... | 252/299.1 |
| 4,891,800 A | | 1/1990 | Sugaya ........................ | 369/275 |
| 5,368,988 A | | 11/1994 | Shinkai et al. .............. | 430/270 |
| 5,530,083 A | | 6/1996 | Phelps et al. ................. | 528/25 |
| 5,558,808 A | | 9/1996 | Smith et al. ................. | 508/556 |
| 5,583,047 A | | 12/1996 | Blinka et al. .................. | 435/5 |
| 5,620,839 A | | 4/1997 | Kawamoto et al. ......... | 430/523 |
| 5,747,632 A | | 5/1998 | Adachi et al. ............... | 528/196 |
| 5,753,413 A | | 5/1998 | Nishida et al. ......... | 430/270.13 |
| 5,815,484 A | | 9/1998 | Smith et al. ............... | 369/275.1 |
| 5,882,358 A | | 3/1999 | Smith et al. .................... | 8/527 |
| 6,011,772 A | | 1/2000 | Rollhaus et al. ............ | 369/286 |
| 6,117,284 A | | 9/2000 | Mueller ................. | 204/192.27 |
| 6,136,347 A | | 10/2000 | Pollinger et al. ............ | 424/495 |
| 6,168,844 B1 | | 1/2001 | Takagishi et al. ........... | 428/64.1 |
| 6,228,440 B1 | | 5/2001 | Dailey et al. ................. | 428/1.1 |
| 6,338,933 B1 | | 1/2002 | Lawandy et al. ......... | 430/270.1 |
| 6,475,588 B1 | | 11/2002 | Schottland et al. ........ | 428/64.1 |
| 6,475,589 B1 | | 11/2002 | Pai-Paranjape et al. .... | 428/64.1 |
| 2003/0198892 A1 | | 10/2003 | Ezbiansky et al. ..... | 430/270.14 |
| 2003/0205323 A1 | | 11/2003 | Ezbiansky et al. .......... | 156/310 |

FOREIGN PATENT DOCUMENTS

| | | | |
|---|---|---|---|
| DE | 222205 | 3/1999 | |
| EP | 0 455 585 A1 | 11/1991 | ......... C08G/77/388 |
| EP | 0 658 804 A2 | 6/1995 | ........... G03C/1/795 |
| EP | 0 658 804 A3 | 3/1998 | ........... G03C/1/795 |
| EP | 0 831 473 A2 | 3/1998 | ............ G11B/7/24 |
| GB | 1061948 | 3/1967 | |
| JP | 55030605 | 3/1980 | |
| JP | 60093983 | 5/1985 | |
| JP | Sho 60-213938 | 10/1985 | |
| JP | 5273691 | 10/1993 | |
| PL | 170632 B1 | 7/1994 | |
| WO | WO 96/39693 | 12/1996 | |
| WO | WO 98/11539 | 3/1998 | |
| WO | WO 98/41979 A | 9/1998 | |
| WO | WO 02/29801 A1 | 4/2002 | |
| WO | WO 02/49010 A2 | 6/2002 | |

OTHER PUBLICATIONS

John McMurry, Organic Chemistry, 1988, Second Ed., 751, 530–533.*

Chemical Abstract, vol. 126, No. 20, May 19, 1997, Columbus Ohio, Abstract No. 263931, Walczak, Antoni et al., "Preparation of 4–phenylbenzophenone", 1 page.

International Search Report, International Application No. PCT/US03/28265, International Filing Date: Sep. 10, 2003, Mailing Date: Jan. 20, 2004, 7 pages.

U.S. patent application Publication No. 2003/0002431A1.

U.S. Appl. No. 10/391,401, filed Mar. 18, 2003; Limited Play Data Storage Media and Method for Limiting Access to Data Thereon; 46 pages (GPI–0150).

(List continued on next page.)

Primary Examiner—David W. Wu
Assistant Examiner—Satya B Sastri

(57) ABSTRACT

Disclosed herein is a method for producing a 1-[4-(biphenyl-4-carbonyl)]phenylaminonthraquinone colorant composition where the method comprises: reacting 4-halobenzoic acid with about 1 mole to about 4 moles of a halogenating agent per mole of said 4-halobenzoic acid to form a 4-halobenzoyl halide composition; reacting in the presence of a first catalyst composition, said 4-halobenzoyl halide composition with biphenyl, in a solvent, to form a 1-[4-(biphenyl-4-carbonyl)]halobenzene composition, and reacting in the presence of a second catalyst composition and an acid scavenger, said 1-[4-(biphenyl-4-carbonyl)] phenylaminonthraquinone with a 1-aminoanthraquinone, in a reaction medium comprising a dipolar aprotic solvent, to form said 1-[4-(biphenyl-4-carbonyl)] phenylaminoanthraquinone colorant composition.

24 Claims, No Drawings

OTHER PUBLICATIONS

U.S. Appl. No. 10/384,986; filed Mar. 10, 2003; Method for Making Limited Play Data Storage Media;49 pages (GPI–0151).

U.S. Appl. No. 10/619,643; filed Jul. 15, 2003; Colored Polymeric Resin Composition, Article Made Therefrom, and Method for Making the Same; 44 pages (GPI–0126).

U.S. Appl. No. 10/619,642; filed Jul. 15, 2003; Limited Play Optical Storage Medium, Method for Making the Same; 69 pages (GPI–0121).

Japanese Abstract, Patent No.: JP60093983, May 25, 1985, 5 pgs.

Japanese Abstract, Patent No.: JP55030605, Mar. 4, 1980, 4 pgs.

Japanese Abstract, Patent No.: 06–060422, Mar. 4, 1994, 7 pgs.

Japanese Abstract, Patent No.: JP5273691, Oct. 22, 1993, 5 pgs.

FlexPlay Coating Recipe, Aprilis, Inc. and FlexPlay Technologies, Inc., Richard Minns, Mar. 29, 2000, 3 pgs.

ECMA, Standardizing Information and Communication Systems, Standard ECMA—267, 3rd Edition—Apr. 2001, 95 pgs.

wysiwyg://119/http://www.matweb . . . cMaterialPrint.asp-?bassnum=C, MatWeb.com, The Online Materials Database Overview—Polycarbonate, Optical Grade, 3 pgs.

Encyclopedia of Polymer Science and Technology, vol. 1, Interscience Publishers, John Wiley & Sons, Inc., 1964, pp. 246 et seq.

Proceedings, Annual Technical Conference—Society of Vacuum Coaters 1998, Soc. Of Vacuum Coaters, Albuquerque, NM, USA, pp. 424–428.

* cited by examiner

METHOD FOR PREPARATION OF AN ANTHRAQUINONE COLORANT COMPOSITION

CROSS REFERENCE TO RELATED APPLICATION

This application is a division of U.S. application Ser. No. 10/284,064, filed Oct. 30, 2002 now abandoned.

BACKGROUND

The disclosure relates generally to a method for preparing a 1-[4-(biphenyl-4-carbonyl)]phenylaminoanthraquinone colorant composition.

Anthraquinone derivatives have been widely used in various dye and pigment compositions in such diverse areas as tracer chemistry, polymer industry, etc. Numerous synthetic routes have been devised to obtain these anthraquinone derivatives.

It is therefore desirable to develop a convenient, scalable method for producing the 1-[4-(biphenyl-4-carbonyl)] phenylaminoanthraquinone colorant composition.

BRIEF DESCRIPTION

A method for producing a 1-[4-(biphenyl-4-carbonyl)] phenylaminoanthraquinone colorant composition comprises:

reacting a 4-halobenzoic acid with about 1 mole to about 4 moles of a halogenating agent per mole of said 4-halobenzoic acid to form a 4-halobenzoyl halide composition;

reacting in the presence of a first catalyst composition, said 4-halobenzoyl halide composition with biphenyl, in a solvent to form a 1-[4-(biphenyl-4-carbonyl)]halobenzene composition; and reacting in the presence of a second catalyst composition and an acid scavenger, said 1-[4-(biphenyl-4-carbonyl)] halobenzene composition with a 1-aminoanthraquinone, in a reaction medium comprising a dipolar aprotic co-solvent, to form said 1-[4-(biphenyl-4-carbonyl)] phenylaminoanthraquinone colorant composition.

In another embodiment of the disclosure, a method for producing a 1[4-(biphenyl-4-carbonyl)] phenylaminoanthraquinone colorant composition comprises:

reacting one mole of a 4-bromobenzoic acid with about 1.1 moles to about 4 moles of thionyl chloride per mole of 4-bromobenzoic acid to form a 4-bromobenzoyl chloride composition;

reacting in the presence of aluminum chloride, said 4-bromobenzoyl chloride composition with biphenyl in a solvent comprising nitrobenzene, to form a 1-[4-(biphenyl-4'-carbonyl)]bromobenzene; and reacting in the presence of an acid scavenger composition comprising potassium carbonate and sodium acetate, and a second catalyst composition comprising about 1 part of copper per part by weight of copper(I) iodide, said 1-[4-(biphenyl-4-carbonyl)]bromobenzene composition with a 1-aminoanthraquinone in a solvent comprising N,N-dimethylformamide, to form said 1-[4-(biphenyl-4-carbonyl)]phenylaminoanthraquinone colorant composition.

The above-described embodiments and other features will become better understood from the detailed description that follows.

DETAILED DESCRIPTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

Disclosed herein are methods for preparing 1-[4-(biphenyl-4-carbonyl)]phenylaminoanthraquinone colorant composition. The structure of 1-[4-(biphenyl-4-carbonyl)] phenylaminoanthraquinone is shown below in Formula (I). The colorant is a valuable material for producing red polymeric resin compositions.

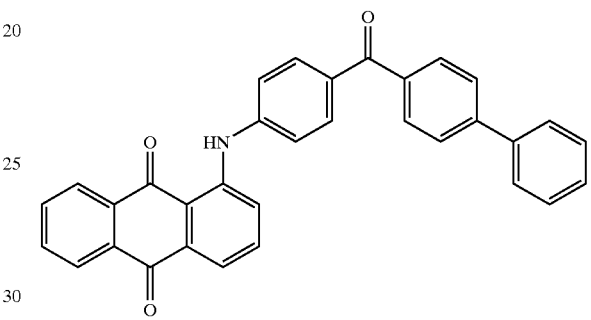

(I)

In the present disclosure, a 4-halobenzoic acid compound is reacted with a halogenating agent to produce the corresponding 4-halobenzoyl chloride. The 4-halobenzoic acid is at least one selected from the group consisting of 4-chlorobenzoic acid, 4-bromobenzoic acid, 4-iodobenzoic acid, and mixtures thereof. In some embodiments, the halogenating agent comprises a halogen-containing phosphorus compound, a halogen-containing sulfur compound, and a carbonyl halide. Any combination of these halogenating agents can be used. In one embodiment, the halogenating agent is selected from the group consisting of $PCl_3$, $PCl_5$, $PBr_3$, $POCl_3$, $POBr_3$, carbonyl chloride, carbonyl bromide, thionyl chloride, thionyl bromide, sulfuryl chloride, and mixtures thereof. Preferred halogenating agents include thionyl chloride, $PCl_3$, and $SOCl_2$.

A solvent can be optionally used in the preparation of the 4-halobenzoyl chloride. Any solvent that would be expected to be inert under the reaction conditions can be used. In many embodiments, the solvent comprises aromatic compounds having from about 6 to about 9 carbon atoms, and aliphatic and alicyclic compounds having from 1 to about 6 carbon atoms. Some examples of aromatic compounds that can be used as a solvent include, but are not intended to be limited to benzene, toluene, ethylbenzene, cumene, isomeric xylenes, chlorobenzene, isomeric dichlorobenzenes, chlorotoluenes, chloroxylenes, nitrobenzene, and the like. Some examples of aliphatic and alicyclic compounds that can be used as a solvent include, but are not intended to be limited to linear and branched hydrocarbons, such as, pentane, hexane, neohexane, heptane, isoheptane, octane, isooctane, cyclohexane, decalin, nitromethane, dichloromethane, 1,2-dichloroethane, 1,1-dichloroethane, chloropropanes, chlorobutanes, chlorocyclohexane, and the like. In a particular embodiment, nitrobenzene is a particularly advantageous solvent—the 4-halobenzoyl chloride composition in nitrobenzene solvent obtained from the halogenation reaction can be directly used as such for the acylation reaction (vide supra) with biphenyl.

In one embodiment, the reaction of 4-halobenzoic acid with the halogenating agent can also be carried out in the presence of a catalyst comprising an amide or a urea compound. In one embodiment, the catalyst comprises from about 0.1 parts to about 5 parts per 100 parts of said 4-halobenzoic acid, of a catalyst comprising an amide compound or a urea compound. Any mixture of the amide compound and the urea compound can also be used.

The reaction of the 4-halobenzoic acid with the halogenating agent can be carried out at any temperature in the range from about ambient temperature to about the reflux temperature of the reaction mixture. In one embodiment, the reaction temperature is in the range from about ambient temperature to about 100° C. In another embodiment, the reaction temperature is in the range of from about ambient temperature to about 60° C. Reaction temperatures higher than 100° C. can be used, but generally is not required due to the facile nature of the reaction. The amount of the halogenating agent can vary over a wide range. In one embodiment, the amount of the halogenating agent taken varies from about 1 mole to about 4 moles per mole of the 4-halobenzoic acid. In a particular embodiment, halogenating agents, such as thionyl chloride, $PCl_3$, and $POCl_3$, which are relatively volatile and therefore can be easily removed from the reaction mixture, are used in excess such that they also function as a solvent for preparing the 4-halobenzoyl halide.

The 4-halobenzoyl halide composition obtained as previously described is reacted with biphenyl in a suitable solvent, and in the presence of a first catalyst composition to form a 1-[4-(biphenyl-4-carbonyl)]halobenzene composition. The acylation of biphenyl with the 4-halobenzoyl halide composition is carried out in solvents selected from the group comprising nitroaromatic compounds, nitroaliphatic compounds, and halogen-containing $C_1$–$C_4$ aliphatic compounds or a mixture thereof. An exemplary nitroaromatic compound is nitrobenzene, and an exemplary nitroaliphatic compound is nitromethane.

The acylation reaction is carried out using a first catalyst composition comprising a Lewis acid catalyst. A wide variety of Lewis acids are available in the art for carrying out the acylation of aromatic compounds. In several embodiments, the first catalyst composition comprises a compound having the formula $M^1X_m$, wherein "$M^1$" is at least one element selected from groups 3 to 15 of the Periodic Table; "X" comprises an electron-withdrawing group, such as a halogen, trifluoroacetate, trifluoromethanesulfonate, and the like; and "m" is an integer having a value from about 2 to about 5. Exemplary compounds comprising the first catalyst composition include, but are not limited to zinc(II) chloride, zinc(II) bromide, aluminum(III) chloride, boron(III) trifluoride, boron(III) trifluoride etherate, boron(III) trifluoromethanesulfonate, tin(IV) tetrachloride, titanium (IV) tetrachloride, zirconium(IV) chloride, iron(III) chloride, antimony(III) chloride, antimony(V) chloride, and the like. In one embodiment, the first catalyst composition comprises at least one of zinc(II) chloride, aluminum(III) chloride, boron(III) fluoride etherate, and iron(III) chloride. Any mixture of the foregoing catalysts can also be used for the acylation reaction. The amount of the first catalyst composition varies, comprising from about 90 moles to about 100 moles per 100 moles of said 4-halobenzoyl chloride.

The temperature range that can be used to effect the acylation reaction varies from about ambient temperature to about 200° C. in one embodiment, and from about 50° C. to about 200° C. in another embodiment. The time required for complete reaction of biphenyl with the 4-halobenzoyl halide composition varies from about 1 hour to about 10 hours in one embodiment, and from about 2 hours to about 8 hours in another embodiment. The progress of the reaction can be followed by thin layer chromatography (hereinafter referred to as "TLC") by monitoring the disappearance of the 4-halobenzoyl halide. An aliquot of the reaction mixture is taken and quenched with aqueous hydrochloric acid. The organic layer is then separated and treated with an excess of methanol to convert any unreacted 4-halobenzoyl halide to the corresponding methyl 4-halobenzoate, which is then identified by TLC. When complete consumption of the 4-halobenzoyl chloride is indicated, the reaction mixture is quenched as described above, and the product can be isolated from the organic solution by techniques well known in the art, such as distillation under atmospheric or reduced pressure, steam distillation, and the like.

The 1-[4-(biphenyl-4-carbonyl)]halobenzene composition is reacted with a 1-aminoanthraquinone in the presence of a second catalyst composition, in a reaction medium comprising a dipolar aprotic solvent, to form a 1-[4-(biphenyl-4-carbonyl)]phenylaminoanthraquinone colorant composition. An exemplary dipolar aprotic solvent is one selected from the group consisting of N,N-dimethylformamide, N-methyl-3-pyrrolidinone, N,N-dimethylacetamide, dimethylsulfoxide, 1,3-dimethyl-2-imidazolidinone, and sulfolane. Any mixture of the dipolar aprotic solvents mentioned hereinabove can also be used. In many embodiments, the reaction medium can also comprise an inert co-solvent, such as substituted and unsubstituted aliphatic and aromatic hydrocarbons, which are miscible with any of the dipolar aprotic solvents mentioned above.

The second catalyst composition comprises copper, a Cu(I) halide (CuX), and a copper(II) halide ($CuX_2$), wherein "X" is selected from chloride, bromide, and iodide. Any combination of the three individual copper-containing components can be used for this reaction. Exemplary second catalyst compositions include those comprising copper, CuCl, CuBr, CuI, $CuCl_2$, $CuBr_2$, and $CuI_2$. In a specific embodiment, the second catalyst composition comprises copper and $CuI_2$. In another specific embodiment, the second catalyst composition comprises copper, CuI, and $CuI_2$. In some embodiments, a copper-containing alloy, such as a copper-bronze or a copper-zinc alloy can also be used. The second catalyst composition comprises about 0.05 parts to about 25 parts per 100 parts by weight of 1-aminoanthraquinone.

An acid scavenger is used in the reaction of 1-[4-(biphenyl-4-carbonyl)]halobenzene composition with 1-aminoanthraquinone to trap the hydrogen halide by-product. The acid scavenger is used in an amount corresponding to at least one molar equivalent of the 1-aminoanthraquinone. The acid scavengers generally comprise carboxylate, carbonate, and bicarbonate salts of alkali metal and alkaline earth metals. The carboxylate salts have the general formula $M(COOR^1)_n$, wherein "M" is an alkali metal or an alkaline earth metal; $R^1$ is a monovalent alkyl group having from about 1 to about 6 carbons; and "n" is selected from 1 or 2. Examples of alkali metal and alkaline earth metal carboxylates include, but are not intended to be limited to lithium acetate, sodium acetate, potassium acetate, lithium benzoate, sodium benzoate, potassium benzoate, lithium propionate, sodium propionate, calcium acetate, calcium propionate, calcium benzoate, and the like. Examples of alkali metal and alkaline earth metal carbonates and bicarbonates include, but are not intended to be limited to lithium carbonate, sodium carbonate, potassium carbonate, lithium bicarbonate, sodium bicarbonate, potassium bicarbonate, and the like. Any combination of the acid scavengers mentioned hereinabove can also be used. In a particular embodiment, an acid scavenger comprises potassium carbonate and sodium acetate.

The reaction of 1-[4-(biphenyl-4-carbonyl)]halobenzene composition with 1-aminoanthraquinone can be carried out at a temperature of from about 50° C. to about 200° C. in one embodiment, and at a temperature of from about 100° C. to about 170° C. in another embodiment. The reaction is generally carried out for a period from about 12 hours to about 30 hours. In an embodiment, the reaction is carried out for a period from about 18 hours to about 24 hours.

In a particular embodiment, the general method described above can be used for preparing a 1-[4-(biphenyl-4-carbonyl)]phenylaminoanthraquinone colorant composition using 4-bromobenzoic acid as the starting material. The method comprises: reacting one mole of a 4-bromobenzoic acid with about 1 mole to about 4 moles of thionyl chloride per mole of 4-bromobenzoic acid, to form a 4-bromobenzoyl chloride composition; reacting in the presence of aluminum chloride, said 4-bromobenzoyl chloride composition with biphenyl in a solvent comprising nitrobenzene, to form a 1-[4-(biphenyl-4-carbonyl)]bromobenzene composition; and reacting in the presence of a second catalyst composition comprising about 1 part of copper per part of copper(I) iodide, said 1-[4-(biphenyl-4-carbonyl)]bromobenzene composition with a 1-aminoanthraquinone in a solvent comprising N,N-dimethylformamide, to form said 1-[4 (biphenyl-4-carbonyl)]phenylaminoanthraquinone colorant composition. In one embodiment, the nitrobenzene solution comprising the 1-[4-(biphenyl-4-carbonyl)]bromobenzene composition can be advantageously used without any further processing, such as complete or partial removal of nitrobenzene, in the subsequent reaction with 1-aminoanthraquinone.

The 1-[4-(biphenyl-4-carbonyl)] phenylaminoanthraquinone composition, prepared using the general method and the method described in the particular embodiment, is used as a valuable colorant for preparing a variety of colored thermoset and thermoplastic resin compositions. In one embodiment, thermoplastic resins that can be used for preparing the colored resin compositions is selected from the group consisting of polyesters, polycarbonates, bisphenol A polycarbonate, polyamides, polyimides, polyamideimides, polystyrenes, rubber-modified polystyrenes, acrylonitrile-containing polymers, polyarylene ethers, poly(2,6-dimethyl-1,4-phenylene ether) and any combination thereof.

The previously described embodiments of the present disclosure have many advantages, including the ability to produce a 1-[4-(biphenyl-4-carbonyl)] phenylaminoanthraquinone colorant composition in an expedient and cost-effective manner. The methods described hereinabove can be conducted either in a batch process, or with suitable modifications, as would be apparent to those skilled in the art, in a semi-continuous process or a continuous process.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

EXAMPLE 1

High performance thin layer chromatography (hereinafter referred to as "HPTLC") was performed using a Camag TLC Scanner 3 instrument equipped with a flame ionization detector, and a Camag Linomat IV automatic spotter.

This Example describes the preparation of 4-bromobenzoyl chloride from 4-bromobenzoic acid.

4-Bromobenzoic acid (6.03 g) was charged into a 100 ml 3-necked round-bottomed flask equipped with a thermometer, a double surface condenser with chilled water circulation, a calcium chloride guard tube, and a magnetic stir bar. The guard tube was connected to a HCl gas scrubber. To the 4-bromobenzoic acid was added thionyl chloride (14.27 g) drop wise over a period from about 10–15 minutes, with stirring. To the resulting suspension was then added a drop of N,N-dimethylformamide. The reaction mixture was then heated with stirring to reflux temperature (oil bath temperature was 90–92° C.). The progress of the reaction was monitored by thin layer chromatography (hereinafter referred as "TLC"), by first quenching an aliquot of the reaction mixture with methanol, then spotting the methanol-quenched sample on a pre-coated silica plate, and then eluting with 20% (on a volume basis) ethyl acetate in hexane. Generally the reaction mixture became homogeneous when the starting 4-bromobenzoic acid had completely reacted. When TLC indicated complete disappearance of the starting 4-bromobenzoic acid, the oil bath temperature was raised to about 100° C., and the excess thionyl chloride was distilled off under a nitrogen atmosphere. The 4-bromobenzoyl chloride remaining in the reaction flask was used in the next step without further purification.

EXAMPLE 2

This Example describes the preparation of 1-[4-(biphenyl-4-carbonyl)]bromobenzene from 4-bromobenzoyl chloride prepared as described in Example 1.

In a 100 ml single necked round bottom flask, 4.5 g of anhydrous aluminum chloride was dissolved in 50 ml of nitrobenzene. In a 250 ml 3-necked round-bottomed flask equipped with a thermometer, a double surface condenser with chilled water circulation, and a calcium chloride guard tube connected to an HCl scrubber, was charged the 4-bromobenzoyl chloride, prepared as described in Example 1. To this mixture with stirring was added the solution of anhydrous aluminum chloride in nitrobenzene in one portion, followed by biphenyl (4.62 g). The reaction temperature was then raised to 87° C. (by heating the reaction flask with an oil bath maintained at about 90° C.) with continued stirring. Reaction progress was monitored by taking an aliquot of the reaction mixture, quenching it with dilute aqueous hydrochloric acid, followed by extraction with ethyl acetate. The ethyl acetate extract was spotted on a TLC silica plate and eluted with 20% (on a volume basis) ethyl acetate in hexane. After being heated for 16 hours, only traces of biphenyl was detected by TLC analysis. The heating was stopped, and the reaction mixture was cooled to about room temperature and poured onto 250 ml of 10% (volume basis) aqueous hydrochloric acid maintained at about 5° C. The aqueous and organic layers were separated, and each layer was filtered to remove insoluble material. The aqueous layer was washed thrice with 75 ml portions of dichloromethane, and the combined dichloromethane washes was combined with the nitrobenzene layer. The combined organic solution was first evaporated to remove the dichloromethane. Then nitrobenzene was distilled off azeotropically using water. The crude reaction product thus obtained was dissolved in dichloromethane, filtered to remove insoluble material, and then washed with 250 ml of 5% (by weight) aqueous sodium bicarbonate solution. The organic layer was separated, dried over anhydrous sodium sulfate for 10 hours, and decanted. After removal of dichloromethane from the decanted solution under reduced pressure, the resulting solid product was stirred for 30 min with 20% (on a volume basis) ethyl acetate in hexane to dissolve traces of biphenyl. The remaining insoluble solid was filtered and dried under reduced pressure (100 mm Hg) at 60° C. for 12 hours to furnish 1-[4-(biphenyl-4-carbonyl)] bromobenzene, which showed one spot by TLC analysis using 20% (volume basis) ethyl acetate in hexane. The yield of the final product was 7.2 grams, or 70% of theoretical yield.

EXAMPLE 3

This Example describes the preparation of 1-[4-(biphenyl-4-carbonyl)]phenylaminoanthraquinone colorant composition from 1-[4-(biphenyl-4-carbonyl)] bromobenzene.

A 250 ml round-bottomed flask equipped with a thermometer, a double surface condenser with chilled water circulation, and a calcium chloride guard tube was charged with dry N,N-dimethylformamide (75 ml), 7.2 g 1-[4-(biphenyl-4-carbonyl)]bromobenzene, 1-amino anthraquinone (4.7 g), copper(I) iodide (426 mg), copper metal powder (426 mg), potassium carbonate (426 mg), and sodium acetate (2.98 g), in the indicated order. The resulting reaction mixture was heated to about 150° C. under nitrogen with stirring for about 25 hours, by which time TLC analysis indicated complete consumption of the starting material. After cooling to room temperature, the reaction mixture was poured onto 500 ml de-ionized water. The solid thus precipitated was filtered, washed with 1500 ml de-ionized water to remove residual DMF, and then with 250 ml methanol. The residual solid was dried in a vacuum oven (100 mm Hg at 60° C.) to furnish 1-[4-(biphenyl-4-carbonyl)] phenylaminoanthraquinone in a yield of 8.7 g, or 80% of theoretical yield. HPTLC analysis indicated that the purity of the product was about 90%. The nuclear magnetic resonance spectrum of the material was consistent with the structure of the desired product.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for producing a 1-[4-(biphenyl-4-carbonyl)] phenylaminoanthraquinone colorant composition, said method comprising:

reacting a 4-halobenzoic acid with about 1 mole to about 4 moles of a halogenating agent per mole of said 4-halobenzoic acid to form a 4-halobenzoyl halide composition;

reacting in the presence of a first catalyst composition, said 4-halobenzoyl halide composition with biphenyl, in a solvent to form a 1-[4-(biphenyl-4-carbonyl)] halobenzene composition; and reacting in the presence of a second catalyst composition and an acid scavenger, said 1-[4-(biphenyl-4-carbonyl)]halobenzene composition with a 1-aminoanthraquinone, in a reaction medium comprising a dipolar aprotic solvent, to form said 1-[4-(biphenyl-4-carbonyl)]phenylaminoanthraquinone colorant composition.

2. The method of claim 1, wherein said reacting 4-halobenzoic acid with a halogenating agent to form a 4-halobenzoyl halide composition further is conducted in a solvent comprising aromatic compounds having from about 6 to about 9 carbon atoms, and aliphatic and alicyclic compounds having from about 1 to about 6 carbon atoms.

3. The method of claim 1, wherein said 4-halobenzoic acid is at least one selected from the group consisting of 4-chlorobenzoic acid, 4-bromobenzoic acid, 4-iodobenzoic acid, and mixtures thereof.

4. The method of claim 1, wherein said halogenating agent comprises a halogen-containing phosphorus compound, a halogen-containing sulfur compound, and a carbonyl halide.

5. The method of claim 1, wherein said halogenating agent is selected from the group consisting of $PCl_3$, $PCl_5$, $PBr_3$, $POCl_3$, $POBr_3$, carbonyl chloride, carbonyl bromide, thionyl chloride, thionyl bromide, sulfuryl chloride, and mixtures thereof.

6. The method of claim 1, wherein said reacting 4-halobenzoic acid with a halogenating agent further is conducted in the presence of from about 0.1 parts to about 5 parts per 100 parts by weight of said 4-halobenzoic acid, of a catalyst comprising an amide compound or a urea compound.

7. The method of claim 1, wherein said solvent comprises nitroaromatic compounds, nitroaliphatic compounds, and halogen-containing $C_1$–$C_4$ aliphatic compounds.

8. The method of claim 1, wherein reacting said 4-halobenzoyl halide composition with biphenyl is carried out at from about an ambient temperature to about 200° C.

9. The method of claim 1, wherein reacting said 4-halobenzoyl halide composition with biphenyl is carried out at from about 50° C. to about 200° C.

10. The method of claim 1, wherein reacting said 4-halobenzoyl halide composition with biphenyl is carried out for a duration from about 1 hours to about 10 hours.

11. The method of claim 1, wherein reacting said 4-halobenzoyl halide composition with biphenyl is carried out for a duration from about 2 hours to about 8 hours.

12. The method of claim 1, wherein said first catalyst composition comprises an inorganic halide having the formula $M^1X_m$, wherein "$M^1$" is at least one element selected from groups 3 to 15 of the Periodic Table; and "m" is an integer having a value from about 2 to about 5.

13. The method of claim 1, wherein said first catalyst composition comprises at least one of zinc(II) chloride, aluminum(III) chloride, boron(III) fluoride etherate, and iron(III) chloride.

14. The method of claim 1, wherein said first catalyst composition comprises from about 90 moles to about 100 moles per 100 moles of said 4-halobenzoyl chloride.

15. The method of claim 1, wherein said dipolar aprotic solvent is selected from the group consisting of N,N-dimethylformamide, N-methyl-3-pyrrolidinone, N,N-dimethylacetamide, dimethylsulfoxide, 1,3-dimethyl-2- imidazolidinone, and sulfolane, and mixtures comprising any of the foregoing solvents.

16. The method of claim 1, wherein reacting said 1-[4-(biphenyl-4-carbonyl)]halobenzene composition with said 1-aminoanthraquinone is carried out at a temperature of from about 50° C. to about 200° C.

17. The method of claim 1, wherein reacting said 1-[4-(biphenyl-4-carbonyl)]halobenzene composition with said 1-aminoanthraquinone is carried out at a temperature of from about 100° C. to about 170° C.

18. The method of claim 1, wherein reacting said 1-[4-(biphenyl-4-carbonyl)]halobenzene composition with said 1-aminoanthraquinone is carried out for a period from about 12 hours to about 30 hours.

19. The method of claim 1, wherein reacting said 1-[4-(biphenyl-4-carbonyl)]halobenzene composition with said 1-aminoanthraquinone is carried out for a period from about 18 hours to about 24 hours.

20. The method of claim 1, wherein said second catalyst composition comprises of copper, CuX, and $CuX_2$, wherein "X" is selected from chloride, bromide, iodide, and a mixture thereof.

21. The method of claim 1, wherein said second catalyst composition comprises copper and CuI.

22. The method of claim 1, wherein said second catalyst composition comprises about 0.05 parts to about 25 parts per 100 parts by weight of 1-aminoanthraquinone.

23. The method of claim 1, wherein said acid scavenger comprises alkali metal carbonates, alkaline earth metal carbonates, alkali metal bicarbonates; alkaline earth metal bicarbonates, and alkali metal carboxylates and alkaline earth metal carboxylates having the general formula $M(COOR^1)_n$, wherein "M" is an alkali metal or an alkaline earth metal, $R^1$ is a monovalent alkyl group having from about 1 to about 6 carbons, and "n" is selected from 1 and 2.

24. A method for producing a 1-[4-(biphenyl-4-carbonyl)] phenylaminoanthraquinone colorant composition, said method comprising:

reacting one mole of a 4-bromobenzoic acid with about 1.1 moles to about 4 moles of thionyl chloride per mole of 4-bromobenzoic acid to form a 4-bromobenzoyl chloride composition;

reacting in the presence of aluminum chloride, said 4-bromobenzoyl chloride composition with biphenyl in a solvent comprising nitrobenzene, to form a 1-[4-(biphenyl-4-carbonyl)]bromobenzene composition; and reacting in the presence of an acid scavenger comprising potassium carbonate and sodium acetate, and a second catalyst composition comprising about 1 part of copper per part by weight of copper(I) iodide, said 1-[4-(biphenyl-4-carbonyl)]bromobenzene composition with a 1-aminoanthraquinone in a solvent comprising N,N-dimethylformamide, to form said 1-[4-(biphenyl-4-carbonyl)]phenylaminoanthraquinone colorant composition.

\* \* \* \* \*